United States Patent [19]
Inui et al.

[11] 3,990,527
[45] Nov. 9, 1976

[54] STEERING APPARATUS FOR A VEHICLE OF THE TYPE HAVING REVOLVING UPPER BODY WITH RESPECT TO A LOWER BODY THEREOF

[75] Inventors: Takayasu Inui, Osaka; Ryozo Aoyama, Hirakata, both of Japan

[73] Assignee: Kabushiki Kaisha Komatsu Seisakusho, Tokyo, Japan

[22] Filed: Dec. 12, 1975

[21] Appl. No.: 640,278

[30] Foreign Application Priority Data
May 21, 1975 Japan.................. 50-067135[U]

[52] U.S. Cl.............................. 180/6.58; 180/6.48; 180/6.66
[51] Int. Cl.² ......................................... B62D 11/02
[58] Field of Search................ 180/6.58, 6.62, 6.66, 180/6.48, 77 S

[56] References Cited
UNITED STATES PATENTS

| | | |
|---|---|---|
| 2,380,619 | 7/1945 | Terrill.............................. 180/6.58 |
| 3,312,318 | 4/1967 | Ryan............................... 180/6.58 X |
| 3,489,235 | 1/1970 | Watson.......................... 180/6.58 X |
| 3,494,439 | 2/1970 | Kline............................... 180/6.58 X |
| 3,774,707 | 11/1973 | Bridwell........................... 180/6.48 |

Primary Examiner—Kenneth H. Betts
Assistant Examiner—R. Schrecengost
Attorney, Agent, or Firm—Armstrong, Nikaido & Wegner

[57] ABSTRACT

A steering apparatus for a vehicle of the type having a revolving upper body with respect to a lower body thereof in which a directional control valve is provided in a hydraulic circuit to maintain the same steering control when upper body of the vehicle is rotated to 180°. The apparatus comprising a pair of valves for steering, a pair of steering pedal connected to said pair of valves, a directional control valve connected to said pair of valves through hydraulic conduits for right and left steering, a cam provided at around revolving center of the lower body of the vehicle, a switch connected to the directional control valve and, a rocking lever provided on the upper body of the vehicle.

5 Claims, 4 Drawing Figures

STEERING APPARATUS FOR A VEHICLE OF THE TYPE HAVING REVOLVING UPPER BODY WITH RESPECT TO A LOWER BODY THEREOF

BACKGROUND OF THE INVENTION

This invention relates to a steering apparatus for a vehicle of the type having a revolving upper body with respect to a lower body thereof.

Heretofore, in vehicles of the type described above equipped such as powered shovel or swing shovel, controls for steering must be reversed when the upper bodies of the vehicles rotate to 180°.

Accordingly it is difficult to control steering when the upper body of the vehicle is rotated and often times results in mishandling.

SUMMARY OF THE INVENTION

It is, therefore, an object of the present invention to provide a steering apparatus for a vehicle of the type described above in which the same steering is maintained when the upper body of the vehicle rotated to 180°.

It is an other object of the present invention to provide a steering apparatus for a vehicle of the type described above in which a hydraulic flow to motors for driving the vehicle is maintained steady without cut off and steering control is performed in safe.

Other objects, features and advantages of the present invention will be readily apparent from the following description taken in conjunction with the following drawings.

DETAILED DESCRIPTION OF THE PREFERRED EMBODIMENT

Figure 1:
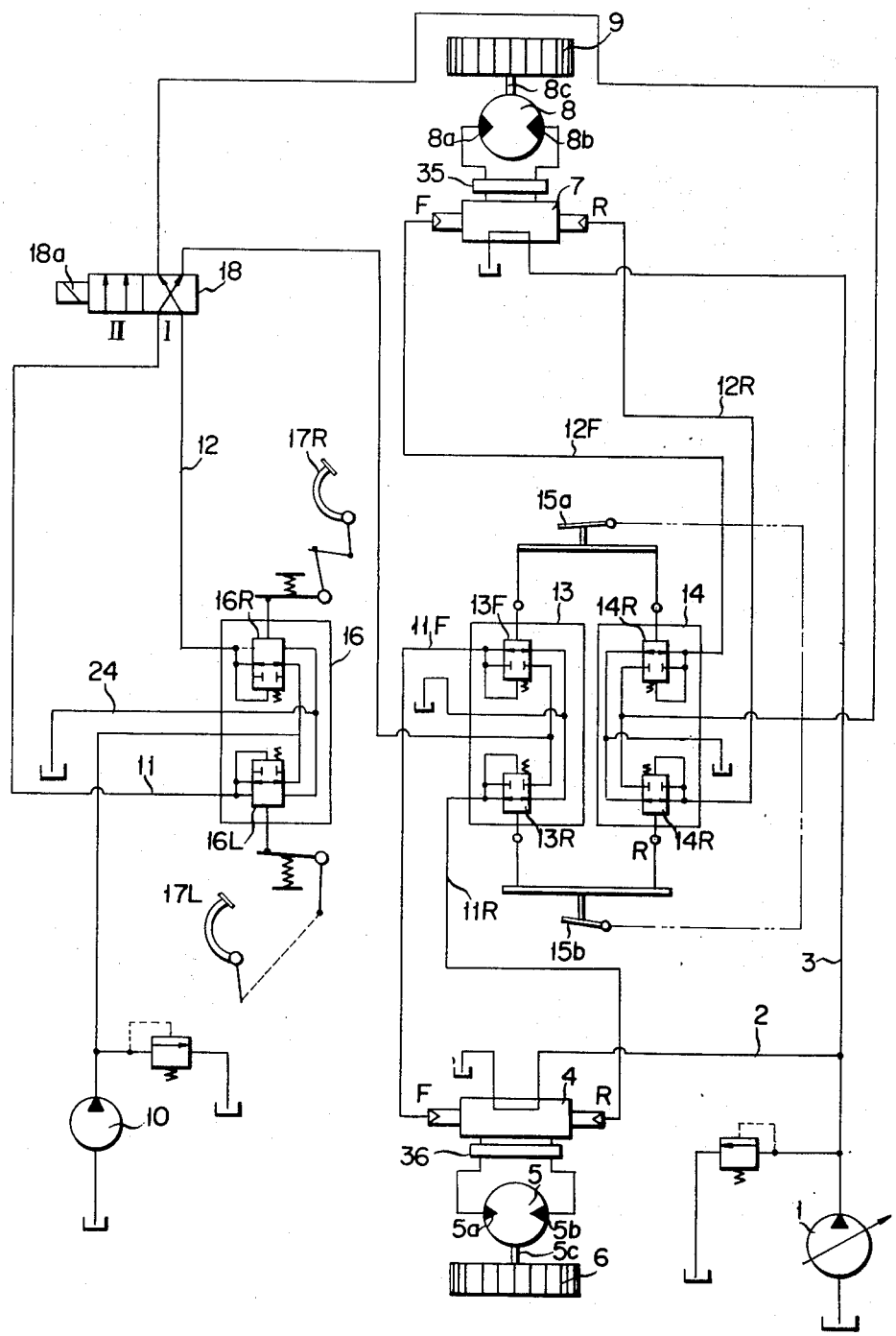
FIG. 1 is a hydraulic circuit of the present invention.
Figure 2:
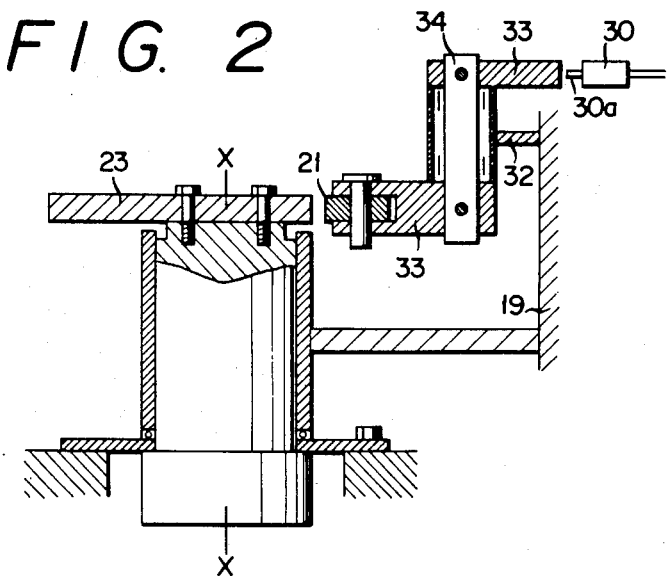
FIG. 2 is a cross sectional view of an essential part of the present invention equipped with a cam and a directional control valve.

Referring to FIG. 1, the liquid discharged from a pump 1 for propulsion is allowed to flow separatedly into the first pipe line 2 and the second pipe line 3, the first pipe line, by way of a pilot-operated propulsion valve 4 located on the lefthand side, is supplied for control to the advancing and reversing ports 5a and 5b of a propulsion motor 5 located on the lefthand side, driving thus an output shaft 5c of the propulsion motor 5 located on the lefthand side in advancing and reversing directions and by this output shaft 5c a lefthand crawler 6 is brought to operation. The second pipe line, by way of a pilot-operated propulsion valve 7 located on the righthand side, is supplied for control to the advancing and reversing ports 8a and 8b of a propulsion motor 8 located on the righthand side, driving thus an output shaft 8c of the propulsion motor 8 located on the righthand side in advancing and reversing directions and by this output shaft 8c the righthand crawler is brought to operation.

10 represents a pump for pilot, the liquid discharged from the aforesaid pump is allowed to flow separatedly into the lefthand side pilot pipe line 11 and the righthand side pilot pipe line 12 and the lefthand side pilot pipe line 11, after branching off into the advancing and reversing pipe lines 11F and 11R, is connected to the advancing and reversing pilot-operated propulsion valve 4. Further, the righthand side pilot pipe line 12 is, after branching off into the advancing and reversing pipe lines 12F and 12R, connected to the righthand side pilot-operated propulsion valve 7.

13 represents a lefthand side propulsion pilot change-over valve provided with an advancing valve 13F and reversing valve 13R and 14 represents a righthand side propulsion pilot change-over valve provided with an advancing valve 14F and reversing valve 14R; each individual propulsion pilot change-over valve 13 and 14 is maintained in a constantly energized condition in a position where a drain outlet is located; at the same time, each individual propulsion pilot change-over valve 13 and 14 is actuated to take the interconnected condition by means of a pair of interconnected hand-operated propulsion levers 15a and 15b.

16 represents a steering pilot change-over valve provided with lefthand and righthand steering pilot change-over valves 16L and 16R, the lefthand steering pilot change-over valve 16L being constantly maintained energized in the interconnected condition and further, being actuated to the cut-off position by means of a lefthand steering pedal 17L. At the same time, the righthand steering pilot change-over valve 16R being constantly maintained energized in the interconnected condition and further, being actuated by a righthand steering pedal 17R to the cut-off position.

The aforesaid lefthand side pilot pipe line 11 and righthand side pilot pipe line 12 are so made that they can be connected in a reversed way: that is to say that when a change-over valve 18 is located in the position I, the lefthand and righthand side pilot pipe lines 11 and 12 are interconnected with the lefthand and righthand side propulsion pilot change-over valves 13 and 14 respectively and when the change-over valve 18 is located in the position II, the lefthand side pilot pipe line 11 becomes to be interconnected with the righthand propulsion pilot change-over valve 14 and the righthand side pilot pipe line 12 with the lefthand propulsion pilot change-over valve 13.

Figure 3:
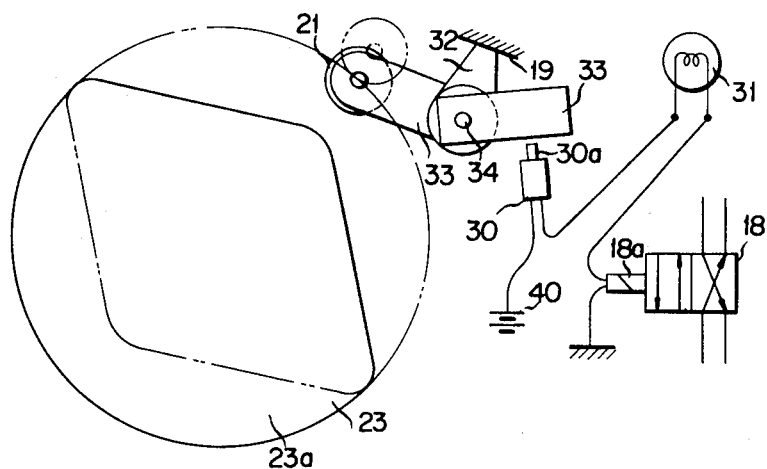
FIG. 3 is a plan view of FIG. 2.

The aforesaid change-over valve 18 is constructed as an electromagnetic valve, one of the terminals of its solenoid 18a being connected, by way of a lamp 31, with a terminal of a switch 30 and further, the other terminal of the solenoid 18a is grounded to the vehicle body and the other terminal of a switch 30 is connected with the power source 40. (Refer to FIG. 3)

To the upper swivelling body 19 is fixed securely a bracket 32 and the bracket 32 is provided with a lever 33 with a pin 34 and on the extreme end of the lever 33 is supported a roller 21. Further, the roller 21 is located in an opposed manner against a plate cam 23 fixed to the swivelling center X-X of the lower propulsion body 22, a contact piece 30 of the aforesaid switch 30 being in contact with the end portion of the aforesaid lever 33. Further, the plate cam 23 is provided with a circular arc surface 23a through an angle of approximately 180°. Further, in the drawing, 35 and 36 represent brake valves.

Figure 4:
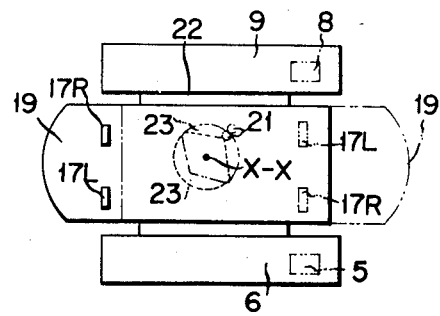
FIG. 4 is a schematic explanational view of a vehicle provided with the present invention.

The detailed description of the operation of the apparatus embodying this invention shall be given in the following:

When the upper swivelling body 19 is oriented in a position facing against the position represented with the solid line in FIG. 4, the profiled surface 23a of the plate cam 23 is out of contact with the roller 21 and accordingly, the change-over valve 18 is located in the position I. When the valves for propulsion 15a and 15b are operated in the position of advancing, lefthand and righthand advancing propulsion pilot change-over valves 13F and 14F are actuate to the position of interconnection and the liquid discharged from the pump 10 for pilot is allowed to flow into the advancing sides of the lefthand and righthand propulsion valves 4 and 7 respectively, admitting the liquid discharged from the propulsion pump 1 into the advancing ports of the lefthand and righthand propulsion motors 5 and 8 by means of changing over to the advancing the propulsion valves 4 and 7 respectively. By this operation, the lefthand and righthand propulsion motors 5 and 8 are made to rotate in the normal direction to drive the lefthand and righthand crawlers 6 and 9 in order to propel the vehicle in the advancing direction.

In the aforesaid condition, when, by operating the lefthand side steering pedal 17L, the lefthand steering pilot change-over valve 16L in the drain position, the lefthand side pilot pipe line 11 is allowed to be connected with the drain pipe line 24. Under this condition, flow of the pilot liquid into the advancing side F of the lefthand side pilot actuating propulsion valve 4 is cut off and thus, the lefthand side pilot actuating propulsion valve 4 is located in the neutral position to stop the lefthand propulsion motor 5. Upon suspension of operation of the lefthand propulsion motor 5, the vehicles takes a turn to the lefthand direction with respect to the running direction.

Next, when the upper swivelling body 19 is swivelled through an angle of 180° into the position as shown in imaginary lines in FIG. 4, the plate cam 23 assumes the position of the position represented by the imaginary lines to actuate the roller 21 to the position of the imaginary lines and then to close the switch 30 to allow an electric current through the solenoid 18a and finally to place the position of the change-over valve 18 in second position II.

In this condition, when the vehicle is propelled in the forward direction by following the same operational procedures as above and during the course of the forward running motion, the lefthand side steering pedal 17L is actuated to place the lefthand steering pilot change-over valve 16L in the drain position, then the lefthand side pilot pipe line 11 becomes to be connected with the drain pipe 24. At this moment, as the lefthand pilot pipe line 11 has already been connected with the righthand propulsion pilot change-over valve 14 by way of change-over valve 18, flow of the pilot liquid to the righthand propulsion pilot change-over valve 14 is cut off to make the righthand side pilot-operated propulsion valve 7 in the neutral position and to stop the righthand propulsion motor 8. Upon stopping of the righthand propulsion motor 8, the vehicle is made to turn in the lefthand direction with respect to its advancing direction.

As stated in the above, regardless of the position to which the upper swivelling body 19 of the vehicle is swivelled, the vehicle is steered to the direction coresponding to the operation of the steering pedal 17L or 17R which has selectively been operated.

Further, without being restricted only to such vehicles which are propelled with an oilhydraulic motor, in case of the crawler driven type vehicles at large equipped with steering clutches which are brought engagement or disengagement by the liquid pressure, the lefthand as well as righthand liquid pipe lines which bring the lefthand and righthand steering clutches into engagement or disengagement may mutually be connected in such a way that they are reversely connected.

As the present invention is based upon the conception as described in detail in the above and as a upper swivelling body 19 is mounted on the propelling body 22 which is steered in the lefthand and righthand directions by driving and stopping, by the liquid pressure, each power source of the lefthand and righthand crawlers 6 and 9, the lefthand side steering pedal 17L and righthand steering pedal 17R which operates engagedly and disengagedly the lefthand side liquid pressure pipe line 11 and righthand side liquid pressure pipe line 12 respectively of the lefthand and righthand driving sources are mounted on the upper swivelling body 19, the plate cam 23 provided with the approximately 180° circular cam surface 23a is mounted on the swivelling center X—X of the propelling body 22, the lever 33 which swings in contact with the circular arc cam surface 23a by the rotation of the plate cam 23 is mounted on the upper swivelling body 19, in the solenoid 18a of the change-over valve 18 performing switching of the liquid pressure to the aforesaid lefthand side liquid pressure pipe line 11 and righthand side liquid pressure pipe line the switch 30 which is operated by the swing motion of the aforesaid lever 33 is mounted, the change-over valve 18 becomes available to be switched in an instantaneous manner and thus, the neutral position becomes eliminated and accordingly, the controlling liquid pressure is short-circuited to either one of the pipe lines. This new arrangement eliminates in this way the cut-off of the controlling liquid pressure, resulting to safer conduction of the steering system.

What is claimed is:
1. A steering apparatus for a vehicle of the type having a revolving upper body with respect to a lower body thereof comprising a pair of valve means for changing steering in right and left directions, a pair of steering pedal means connected to said pair of valve means, directional control valve means connected to said pair of valve means through hydraulic conduits for right and left steering, a cam provided at the revolving center of said lower body, switching means connected to said directional control valve and, a rocking lever provided on said upper body of the vehicle, one end of said rocking lever being in contact with said switching means and the other end thereof having a cam follower to follow said cam.

2. A steering apparatus of claim 1 wherein said cam has a cam surface of about 180°.

3. A steering apparatus of claim 1, further comprising a pair of pilot operated valve means for controlling forward and backward movements of the vehicle, said pilot operated valve means being actuated and controlled by said directional control valve means by changing hydraulic pressure pass of the conduits.

4. A steering apparatus of claim 1, wherein said rocking lever is provided on said upper body of the vehicle through a bracket.

5. A steering apparatus of claim 1, wherein said directional control valve is an electromagnetic valve.

* * * * *